July 17, 1928.

W. H. JONES

PIPE FLANGE WRENCH

Filed June 18, 1925   2 Sheets-Sheet 1

1,677,637

July 17, 1928.  
W. H. JONES  
PIPE FLANGE WRENCH  
Filed June 18, 1925  
1,677,637  
2 Sheets-Sheet 2
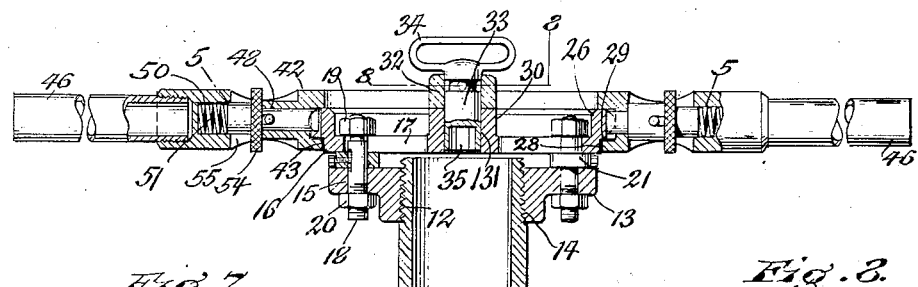
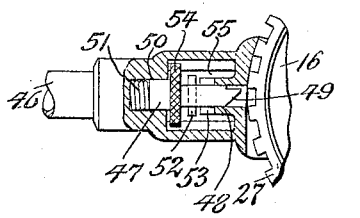
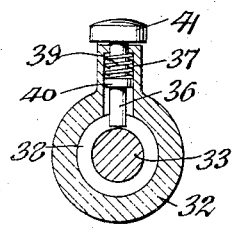
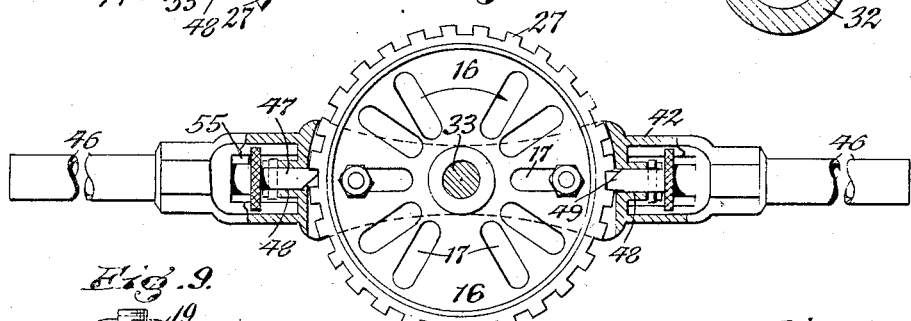
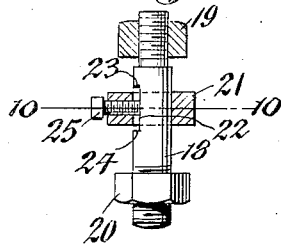
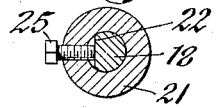
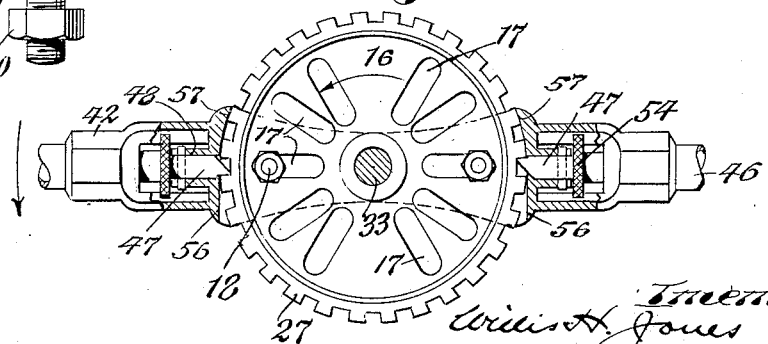

Patented July 17, 1928.

1,677,637

UNITED STATES PATENT OFFICE.

WILLIS H. JONES, OF BUFFALO, NEW YORK.

PIPE-FLANGE WRENCH.

Application filed June 18, 1925. Serial No. 37,938.

This invention relates to a wrench which is more particularly designed for screwing flanges on and off from the ends of pipes which are adapted to be connected with each other by means of flange couplings, such pipes being usually employed as conduits for steam, water, air and oil or other fluids which are subjected to high pressure. The flanges are screwed upon the opposing ends of two pipes and these flanges are bolted together so as to form a continuous conduit.

Heretofore these flanges usually have been screwed on or off such pipes by placing bolts temporarily in the holes of the flanges and then engaging such bolts by means of a crowbar extended crosswise of the flange and pipe so as to engage bolts on diametrically opposite sides of the axis of the flange and pipe and then turning the flange. This method is very crude and has been found objectionable not only on account of the loss of time but also on account of the frequent breakage of the bolts or flanges.

It is the object of this invention to provide a pipe flange wrench of simple and durable construction whereby such flanges can be easily and conveniently screwed on or off of the pipe without liability of breaking any of the parts and also permit of using the same tool without any alteration in construction on pipe flanges of different sizes and on flanges of this character in which various numbers of coupling bolts may be employed which may be spaced apart different distances on different flanges.

In the accompanying drawings Figure 1, is a front elevation of a suitable form of a pipe flange wrench embodying my invention.

Figure 4, is a horizontal section taken on line 4—4, Figure 1.

Figure 5, is a vertical transverse section taken on line 5—5, Figure 4, showing the ratchet mechanism adjusted for turning the wrench in the direction for screwing the pipe flange on to the pipe.

Figure 6, is a similar view showing the parts adjusted for turning the pipe flange in the direction for unscrewing the same from a pipe.

Figure 7, is a fragmentary view similar to Figures 5 and 6, showing one of the ratchet dogs or pawls in a position preparatory to reversing the same.

Figure 8, is a cross section, on an enlarged scale, taken on the correspondingly numbered line in Figure 4.

Figure 9, is a detached sectional elevation of one of the coupling devices for detachably connecting the body or spider of the wrench with the pipe flange which is to be operated upon.

Figure 10, is a cross section taken on line 10—10, Figure 9.

Similar characters of reference indicate like parts throughout the several views.

Figure 1:
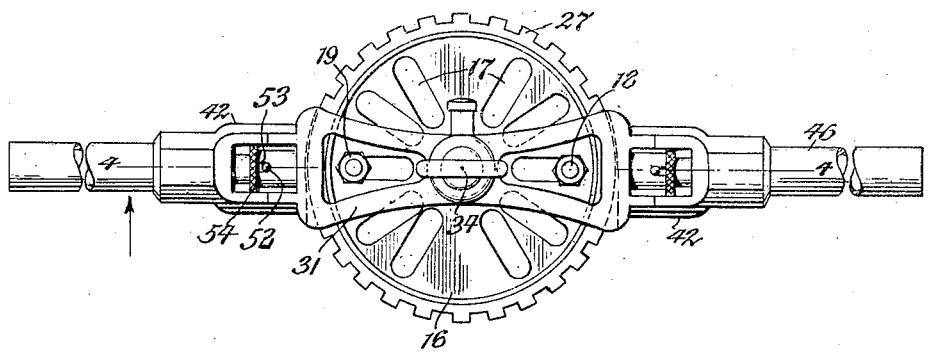
Figure 2:
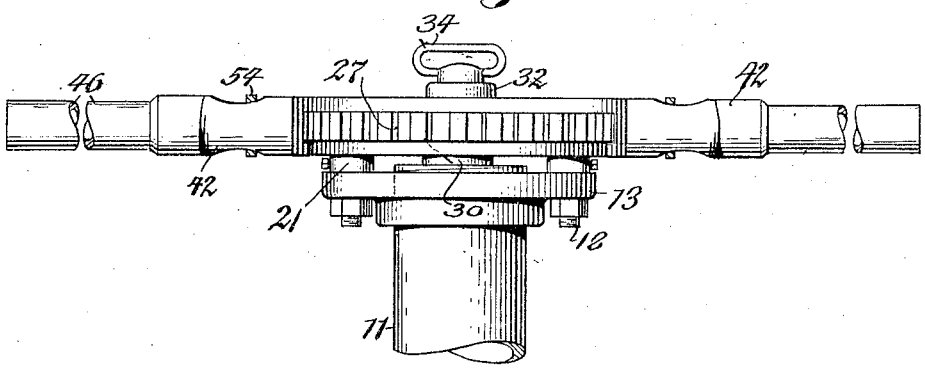
Figure 2, is a top plan view of the same.

The numeral 11 represents a pipe which is provided at its end with an external screw thread 12, and 13 represents a flange which is provided with a central internally threaded opening 14 adapted to engage with the threaded end of said pipe and also provided with an annular row of openings 15 adapted to receive bolts whereby this flange is detachably connected with a similar flange on another pipe for connecting the same and forming a continuous conduit. In the present case the pipe flange is represented as having four equidistantly spaced coupling bolt holes, but this number of bolt holes varies according to the size or diameter of the flange or the pipe upon which it is mounted.

In order, therefore, to meet different requirements it has been the practice heretofore to provide the flanges with either 2, 3 or 5, equally spaced bolt holes, or multiples of the same to suit different conditions and requirements.

The preferred embodiment of pipe wrench shown in the drawings as an example of my invention is constructed as follows:

The numeral 16 represents the body or spider of the wrench which is generally constructed in the form of a circular disk or wheel and is adapted to be arranged across the front side or face of the pipe flange 13 which is to be screwed on or off of the pipe 11.

This body may be detachably connected with the front side of the pipe flange by any suitable means so that its axis is in line with that of the pipe flange which is to be turned and the pipe relative to which the flange is to be turned for screwing the same on or off. In the preferred manner of detachably connecting this wrench body with the pipe flange the wrench body is provided with a plurality of radial slots 17 which are arranged at differently spaced distances from each other in a direction circumferentially of the body, the particular arrangement of these slots as shown in Figures 1, 5 and 6, being such that either 2, 3 or 5 of these slots, or multiples of the same, may be utilized to receive fastening bolts, in correspondingly numbered equidistantly spaced openings in a pipe flange.

In the drawings, two fastening bolts are employed for connecting the wrench body with a pipe flange on diametrically opposite sides of the axes of the same, each of these bolts having a longitudinal shank 18 passing through one of the slots 17 of the wrench body and one of the openings 15 of the pipe flange and screw nuts 19 and 20 applied to the externally threaded front and rear ends of the shank 18 and bearing respectively against the front side of the wrench body and the rear side of the pipe flange. Ordinarily the thread of the pipe is only cut far enough to receive the entire length of the threaded opening of the pipe flange but occasionally the pipe is threaded farther than this which makes it necessary to screw the flange on to the pipe to such an extent before it is tight that the front end of the pipe sticks forwardly beyond the front face of the flange. In order, therefore, to permit of screwing the pipe flange on to the pipe the required distance, even though the pipe projects forwardly from the pipe flange and still prevent the wrench body from engaging with the front end of the pipe, a spacing collar 21 is mounted upon the shank 18 of each of the coupling bolts so as to separate the body of the wrench from the pipe flange a distance greater than the front end of the pipe is likely to project beyond the front side of the pipe flange. Each of these spacing collars is free to move lengthwise on the respective shank 18 of the coupling bolt but is prevented from becoming detached therefrom, this being preferably accomplished by providing the shank of the coupling bolt between its front and rear ends with a flattened face 22 which terminates in front and rear shoulders 23, 24 and a stop screw 25 arranged on the spacing collar 21 and having its inner end arranged close to the flattened portion 22 of the shank and adapted to engage either of the shoulders 23, 24 upon moving the spacing collar in one direction or the other relatively to the shank. In the use of this coupling bolt the rear end of the same is first passed through one of the openings 15 in the pipe flange and then the rear nut 20 is applied thereto. The front end of this shank is then engaged with one of the slots 17 of the wrench body and the front nut 19 is applied thereto. Upon now tightening either one or both of the nuts 19 and 20 the rear nut will be pressed against the rear side of the pipe flange and the front nut will be pressed against the front side of the wrench body and the spacing collar 21 will be clamped between the pipe flange and the wrench body, during which time this collar will shift its position lengthwise upon the shank as may be necessary in order to produce a full clamping effect of each coupling bolt upon the wrench body, and the flange and the spacing collar therebetween for rigidly holding these parts in their proper position relatively to each other.

This body is provided at its margin with an annular forwardly projecting rim 26, the periphery of which is provided with an annular row of ratchet teeth 27 which are preferably so constructed that each tooth has a radial or square face on its opposite sides and therefore, can be utilized in connection with other parts as a ratchet mechanism for turning the wrench body step by step in either direction.

The provision of the flange 26 on the front side of the wrench body gives the latter as a whole a rearwardly dished form in the hollow or concave side of which the necessary space is provided for the reception of the nuts 19 on the front end of the shank 18. In rear of the annular row of ratchet teeth on the periphery of the wrench body the same is provided with an annular guide face 28 which is of smaller diameter than the row of ratchet teeth and thereby forms a rearwardly facing shoulder 29 on the periphery of the ratchet body. On its central part the wrench body is provided with a forwardly projecting tubular hub 30, the opening 131 in which is of cylindrical form.

The numeral 31 represents the cross-bar of a wrench lever which is adapted to extend transversely and diametrically across the front side of the wrench body and is provided with ratchet means which engage with the ratchet teeth on the body and also with pivot means whereby this lever is connected with the wrench body and is capable of turning about the axis thereof. In the preferred form of the pivotal connection between this wrench cross-bar and the wrench body the central part of the cross-bar is provided with a tubular socket 32 which normally is arranged axially in line with the hub of the wrench body and a pivot pin 33 adapted to engage with the central opening of the wrench bar hub 32 and the hub 30 of the wrench body. This pivot pin is provided on its front end with a handle 34 for convenience in manipulating the same and its inner end is provided with a socket 35 which is adapted to engage with the nuts 19 and 20 of the shanks 18 for tightening or loosening said nuts and thus permit of dispensing with the use of a separate tool for this purpose. In order to prevent the pivot pin 33 from becoming detached from the hubs 30 and 32 a locking device is provided which preferably consists of a locking pin 36 guided in a socket 37 on one side of the hub 32 and held with its inner end yieldingly in engagement with an annular groove 38 in the pivot pin 33 by means of a spring 39 surrounding the locking pin 36 and bearing at its inner end on a collar 40 on this pin and at its outer end against the bottom of the socket 37, as best shown in Figure 8. This locking pin is manipulated by means of a finger piece 41 arranged at the outer end of the same, as shown in the last mentioned figure.

At its opposite ends the cross bar 31 of the wrench lever is provided with two heads 42 which project rearwardly along the teeth of the wrench body on diametrically opposite sides thereof, and at the rear ends of these heads the same are provided with inwardly projecting lugs 43, the front sides of which are arranged in rear of the rearwardly facing shoulders 29 on the wrench body. These heads and lugs are so constructed that the heads can only be applied to the wrench body on diametrically opposite sides thereof and the lugs thereof engage with the rear sides of the annular row of ratchet teeth by moving the wrench cross-bar in a direction radially and in a plane intersecting the axis of the wrench body at right angles and thereby prevents the wrench heads from being detached from the wrench body by a forward pull on the same when the parts are assembled, inasmuch as the retaining lugs 43 at this time engage with the shoulder 29 on the rear side of the annular row of ratchet teeth as shown in Figure 4.

Figure 3:
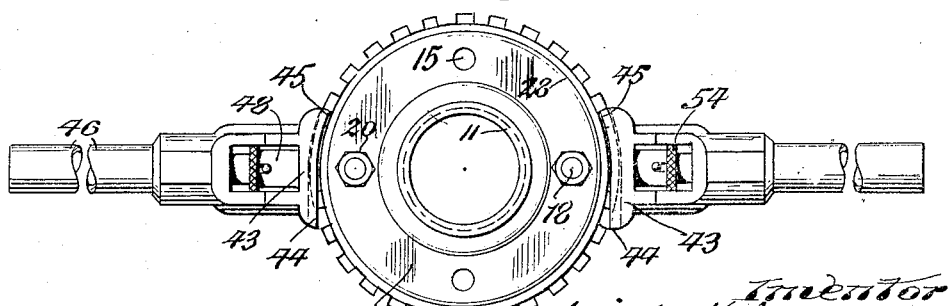
Figure 3, is a rear elevation of the same applied to the pipe flange.

For convenience in assembling the wrench cross-bar with the wrench body, means are provided for preventing the wrench heads and cross bar from passing beyond the center of the wrench body, when moving the heads and cross-bar inwardly across the body. For this purpose the two corresponding ends 44 of the retaining lugs 43 are spaced apart a distance greater than the diameter of the annular guide face 28, while the other two corresponding ends 45 of these retaining lugs are spaced apart a distance less than the diameter of this annular guide face 28, as shown in Figure 3. Similarly corresponding ends 56 of the inner faces of the heads 42 are spaced apart a distance greater than the diameter of the annular row of ratchet teeth on the wrench body and the other two corresponding ends 57 of these faces are spaced apart a distance less than the diameter of these teeth, as shown in Figures 5 and 6. It follows from this construction that this wrench cross bar and head can only be passed from one side of the wrench body inwardly to the center of the same but not beyond their center to the opposite side of the wrench body, inasmuch as the closely spaced ends 45 of the retaining lugs will engage with the annular guide face 28 and the closely spaced ends 57 of the faces on the wrench heads 42 will engage with the ratchet teeth when the wrench lever has reached its central position relatively to the wrench body and thereby prevent further crosswise movement when reaching this position. This renders it very convenient to assemble the wrench cross-bar with the body and pivotally connect the same therewith inasmuch as the wrench cross-bar need only be dropped downwardly over the upper part of the wrench body, until the narrow ends 45 of the retaining lugs engage the guide face 28, and the narrow ends 57 of the head engage the teeth after which the centering pin 33 can be conveniently inserted into the hubs of the wrench cross-bar and body preparatory to operating the wrench. This feature is very desirable in view of the fact that in very large sizes of these wrenches it is possible by this means of assemblage for one man to do the work quickly and conveniently and thus avoid the necessity of employing a helper. The cross-bar and heads of the ratchet lever may be turned by means of a handle 46 arranged either on the outer end of one or both of the heads 42 of the same, a single handle being sufficient for medium sizes of wrenches but two handles being preferred when the wrench is intended for very heavy work or pipe flanges of larger size. Means are provided on this ratchet lever for cooperation with the teeth on the wrench body to permit of turning this ratchet body either forwardly or backwardly, step by step for screwing the same on or off a pipe. In the preferred construction two ratchet dogs or pawls 47 are employed and adapted to engage with diametrically opposite sides of the ratchet teeth on the body. Each of these dogs is round in cross section so as to be capable of sliding lengthwise and also turning in a guide way 48 in one of the lever heads 42 for engaging its inner bevelled end 49 either in one position or in a reverse position with the adjacent teeth on the wrench body. The rear end of this dog slides in a socket 50 on the outer end of the respective head 42 and is yieldingly held in its innermost position by means of a spring 51 arranged in said socket and interposed between the bottom thereof and the outer end of the respective dog, as best shown in Figures 4 and 7. While the ratchet dog is engaging with the teeth of the wrench body in one position, the same is held against turning but capable of sliding lengthwise in its guideways by means of a retaining pin 52 arranged on this dog and sliding in guide slots 53 on the adjacent part of the head 42. If it is desired to reverse the position of the dog the same is pulled backwardly or outwardly sufficiently to disengage its guide pin 52 from the slots 53 and then the dog is turned half way for reversing its bevelled front end 49 and then the same is released so as to reengage its retaining pin 52 with the guide slots 53, after which this dog will be again permitted to move lengthwise but held against turning. This rearward movement of each dog, sufficiently to disengage its guide pin 52 from the slots 53 and then turn the same, is effected by means of a thumb piece 54 which is arranged on the dog outwardly beyond the guide pin 52 and accessible to the fingers of the operator through openings 55 on opposite sides of the respective head 42. For the purpose of utilizing the wrench for screwing a pipe flange on to a pipe, the ratchet dogs or pawls 47 are adjusted so that they become interlocked with the teeth of the wrench body upon turning the wrench lever clockwise, as indicated in Figure 5, whereby the turning motion of the wrench lever in this direction will produce a tightening effect of the flange on the pipe while a reverse motion of this lever will cause the dogs 47 to trip past the ratchet teeth for taking a new hold preparatory to effecting the next forward step of the intermittent rotary movement in a clockwise direction.

When it is desired to unscrew the pipe flange from the pipe the dogs 47 are reversed on the heads, as shown in Figure 6, in which case an oscillating movement imparted to the wrench lever will cause the dogs during the anti-clockwise motion of the lever to become interlocked with the wrench body and turn the same in the direction for unscrewing the same from the pipe while a turning of this lever in the reverse direction will cause the dogs to trip idly backwardly over the ratchet teeth and take a new hold preparatory to effecting the next forward step in the turning movement for unscrewing the flange from the pipe.

As a whole this pipe flange wrench is comparatively simple in construction, it has no delicate parts which are likely to get out of order when subjected to rough usage, it can be very readily applied to and removed from a pipe flange and it permits of screwing the flange on to as well as off from a pipe with ease and facility, thereby materially reducing the cost of doing work of this character as well as preventing the breaking of any bolts or flanges so that this item of loss is also eliminated.

I claim as my invention:—

1. A pipe flange wrench comprising a circular body provided with a plurality of radial slots which are arranged at differently spaced distances from each other in a direction circumferentially of the body, bolts adapted to pass through some of the said slots and the pipe flange to be turned, and a ratchet mechanism for turning said body.

2. A pipe flange wrench comprising a circular body, means for attaching said body to a pipe flange comprising a plurailty of bolts passing with their shanks through said body and flange and having bearing members engaging with the rear side of the pipe flange and the front side of said body and a collar on each shank arranged between said pipe flange and body, and a ratchet mechanism for turning said body.

3. A pipe flange wrench comprising a circular body, means for attaching said body to a pipe flange comprising a plurality of bolts passing with their shanks through said body and flange and having screw nuts at their opposite ends adapted to engage with the rear side of said pipe flange and the front side of said body, a collar loosely mounted on each shank and interposed between said body and pipe flange, and a ratchet mechanism for turning said body.

4. A pipe flange wrench comprising a circular body, means for attaching said body to a pipe flange comprising a plurality of bolts passing with their shanks through said body and flange and having screw nuts at their opposite ends adapted to engage with the rear side of said pipe flange and the front side of said body, a collar mounted on each of said shanks so as to be capable of sliding lengthwise thereon to a limited extent and interposed between said pipe flange and body and ratchet means for turning said body.

5. A pipe flange wrench comprising a circular body, means for attaching said body to a pipe flange comprising a plurality of bolts passing with their shanks through said body and flange and having screw nuts at their opposite ends adapted to engage with the rear side of said pipe flange and the front side of said body, a collar mounted on each of said shanks so as to be capable of sliding lengthwise thereon, each of said shanks being provided between its ends with a flattened portion forming two stops which face toward each other, and each of said collars having a stop screw, the inner end of which is arranged between the stop faces of the companion bolt shank, and a ratchet mechanism for turning said body.

6. A pipe flange wrench comprising a circular body adapted to be attached to a pipe flange and provided with an annular row of teeth and a central pivot opening, a ratchet lever having a dog adapted to engage said teeth and having a part extending across the center of said body and provided with a pivot opening which is adapted to register with the pivot opening of said body, a pivot pin adapted to engage with said pivot opening and provided with a circumferential groove, and a spring pressed locking pin mounted on said lever and yieldingly held in engagement with said locking groove.

7. A pipe flange wrench comprising a circular body provided with an annular row of teeth and adapted to be fastened to the pipe flange to be turned, a ratchet lever provided with clearance so that the same is capable of being moved from one of its lateral sides radially inward of said body to a position concentric thereto and provided with stop means adapted to engage said body so that the lever is incapable of moving into said position from its opposite lateral side, means for pivotally connecting said lever concentric with said row of teeth, and a ratchet dog mounted on said lever and engaging with said teeth.

8. A pipe flange wrench comprising a circular body adapted to be fastened to a pipe flange and provided with an annular row of ratchet teeth and an annular guide face arranged in rear of said row of teeth and of smaller diameter than said row of teeth, a ratchet lever extending across the front side of the body and having rearwardly projecting heads which face on diametrically opposite sides of said row of teeth, and inwardly projecting lugs arranged on the rear sides of said heads and engaging with the rear side of said row of teeth and two of the corresponding ends of said lugs being spaced apart a distance greater than the diameter of said guide face and the other two corresponding ends of said lugs being spaced apart a distance less than the diameter of said guide face, means for pivotally connecting said lever and body, and a ratchet dog mounted on said heads and engaging said teeth.

9. A pipe flange wrench comprising a circular body adapted to be secured to the pipe flange to be turned and provided with an annular row of ratchet teeth and a ratchet lever having means co-operating with said teeth and also having a cross-bar extending across the front side of said body and provided with heads having faces arranged opposite the periphery of said body on diametrically opposite sides thereof and two corresponding ends of said faces being spaced apart a distance less than the external diameter of said teeth and the other two corresponding ends of said faces being spaced apart a distance less than said diameter.

10. A pipe flange wrench comprising a circular body adapted to be secured to the pipe flange to be turned and provided with an annular row of ratchet teeth, a ratchet lever having means co-operating with said teeth and also having a cross-bar extending across the front side of said body and provided with heads having faces arranged opposite the periphery of said body on diametrically opposite sides thereof and two corresponding ends of said faces being spaced apart a distance less than the external diameter of said teeth and the other two corresponding ends of said faces being spaced apart a distance less than said diameter and a pivot connecting said lever and body in line with the axis of said teeth.

WILLIS H. JONES.